United States Patent [19]

Armistead et al.

[11] Patent Number: 5,060,109
[45] Date of Patent: Oct. 22, 1991

[54] ADJUSTABLE ELECTRICAL DEVICE

[75] Inventors: Trevor Armistead; Robert G. Armistead, both of Ulverston, England

[73] Assignee: Oxley Developments Company, Ltd., Cumbria, England

[21] Appl. No.: 520,723

[22] Filed: May 9, 1990

[30] Foreign Application Priority Data

Jun. 9, 1989 [GB] United Kingdom ............... 8913362

[51] Int. Cl.$^5$ ............................................. H01G 5/12
[52] U.S. Cl. .................................................... 361/294
[58] Field of Search ............... 361/287, 291, 292, 294, 361/295

[56] References Cited

U.S. PATENT DOCUMENTS

| 2,271,983 | 2/1942 | La Rue | 361/294 X |
| 3,084,313 | 4/1963 | Crooks | 361/294 |
| 4,851,961 | 7/1989 | Funk | 361/295 |

Primary Examiner—Donald A. Griffin
Attorney, Agent, or Firm—Staas & Halsey

[57] ABSTRACT

An adjustable electrical device, such as a trimmer capacitor, comprising a housing and an electrode movable relative to the housing, the electrode comprising a screw-threaded portion which is resiliently deformable to allow compliant threaded engagement with a complementarily screw-threaded portion of the housing of slightly smaller diameter. The screw-threaded portion is split to allow said deformation, the split being in the form of a slot extending across the screw-threaded portion, parallel to the rotational axis of the screw-threaded portion. A further slot is located at the base of the screw-threaded portion, which interconnects with the slot. The electrode is provided with an actuating member having a head portion adapted to receive an adjusting tool, such as a screwdriver, and a body portion which is an interference fit within the electrode.

13 Claims, 2 Drawing Sheets

ADJUSTABLE ELECTRICAL DEVICE

The present invention relates to adjustable electrical devices, and in particular, but not exclusively, to adjustable capacitors.

It is often desirable to be able to adjust electrical devices by means of mechanical displacement of components of the device. Examples of this are piston multiturn trimmer capacitors which are configured to vary capacitance by the controlled insertion of a piston rotor electrode into a tubular stator, the movement usually being effected by a lead screw arrangement. A further example is the adjustment of an electrode extending into a wave guide.

Such adjustable devices should be relatively wear free so that repeated adjustment may be effected without changing the torque which must itself remain high to prevent any vibrational effects. Furthermore, wear particles should not be generated, as they may interfere with the electrical performance of the device.

Such devices should also have a low resistance and a low inductance in order to provide a high Q performance at high frequencies by increasing the self resonant frequency of the device.

Another very important requirement is that the axis of rotation of any adjusting member must ideally be independent of its position. One known way of achieving this, in the context of a trimmer capacitor, is to have a non-rotating piston which requires an electrically conductive bearing to detach the rotation of the lead screw from the rotor itself. Such an arrangement is complicated and more expensive, and does not fulfil all the other requirements as mentioned above.

Thus, there is a requirement for an electrically adjustable device which has a wear free action, low resistance, low inductance and concentric adjustment yet which will have sufficient torque to prevent inadvertent movement of the adjustment member during vibration, shock or other perturbation. All these requirements must also fulfil the constraints of a minimal size and ease of manufacture.

In accordance with a first aspect of the present invention, an adjustable electrical device comprises a housing and an electrode movable relative to the housing, the electrode comprising a screw-threaded portion which is resiliently deformable to allow threaded engagement with a complimentarily screw-threaded portion of the housing.

The screw-threaded adjustment action allows accurate adjustment, and the resiliently deformable, sprung screw-threaded portion produces sufficient torque to prevent inadvertent movement of the electrode during vibration, shock or other perturbation.

Preferably, the screw-threaded portion is split to allow deformation. The split may be in the form of a slot extending across the screw-threaded portion, preferably parallel to the rotational axis of the screw-threaded portion.

In a preferred embodiment, the electrical device comprises a further slot located at the base of the screw-threaded portion, which interconnects with the first-mentioned slot.

Advantageously, the electrode is provided with an actuating member having a head portion adapted to receive an adjusting tool (e.g. a screw driver) and a body portion which is an interference fit within the electrode. In one embodiment, the electrode is in the form of a tubular electrode, and the body portion of the actuating member is an interference fit within the tubular electrode.

The electrical device may be a trimmer capacitor, which further comprises a stator electrode having a cylindrical portion, the first-mentioned electrode being tubular and movable relative to the stator electrode.

The present invention also includes an adjustable trimmer capacitor assembly comprising a stator electrode having a cylindrical portion, a rotor electrode assembly and a capacitor housing having an internally screw-threaded portion, the rotor electrode assembly comprising a tubular electrode having a resiliently deformable screw-threaded portion at one end thereof, the rotor assembly further comprising an electrode actuating member having a head portion adapted to receive an adjusting tool and a body portion which is an interference fit within the tubular electrode, whereby the screw-threaded portion of the rotor electrode assembly is resiliently deformed to allow threaded engagement with the screw-threaded portion of the housing, rotation being effected by means of the electrode actuating member.

Preferably, the screw-threaded portion is split to allow deformation. The split may be in the form of a slot extending across the screw-threaded portion, preferably parallel to the rotational axis of the screw-threaded portion.

In a preferred embodiment, the electrical device comprises a further slot located at the base of the screw-threaded portion, which interconnects with the first-mentioned slot. Advantageously, the slot is part-circumferential.

By way of example only, a specific embodiment of the present invention will now be described, with reference to the accompanying drawings, in which.

Figure 1:
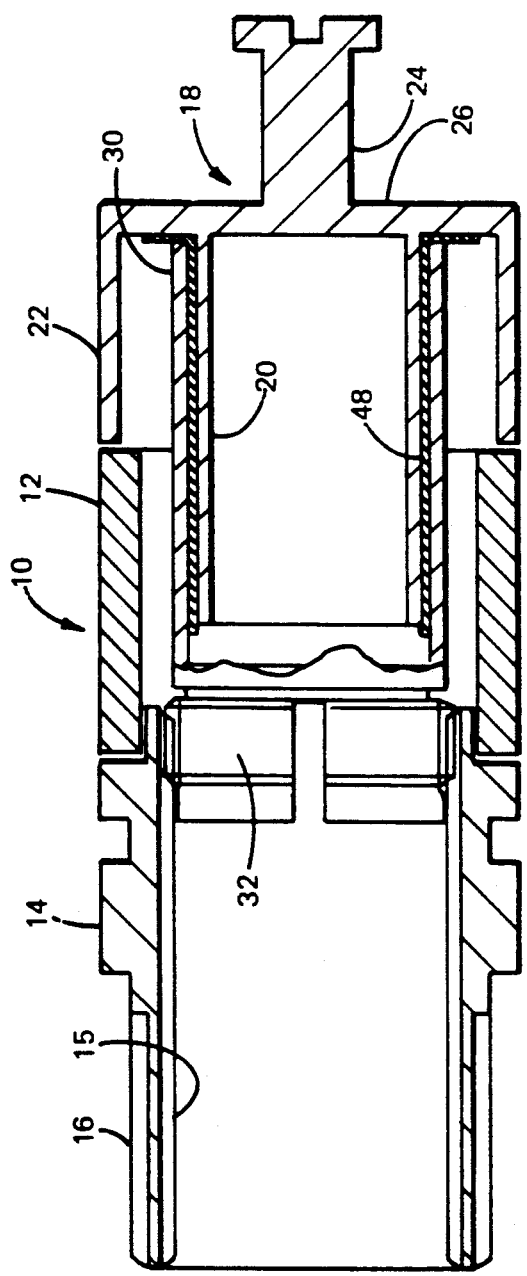
FIG. 1 is a cross section of an embodiment of adjustable trimmer capacitor in accordance with the present invention.

Referring firstly to FIG. 1, the adjustable trimmer capacitor comprises a housing 10 in the form of a first, dielectric tubular section 12, and a second, metallic, internally screw-threaded, generally tubular electrode contact portion 14, which is an interference fit within the tubular portion 12. The free end of the electrode contact portion 14 is also provided with an external screw-thread 16 by means of which it may be electrically connected to other components, e.g. an electrical circuit.

The capacitor is provided with a metallic stator electrode 18 having an inner tubular portion 20 and an outer, coaxial, tubular portion 22. An electrical connecting lug 24 extends from the outer surface of the circular base 26 of the stator electrode.

The adjustable capacitor also comprises a movable, metallic "rotor" electrode having a tubular portion 30 radially outward of the inner tubular portion 20 of the stator electrode, the overlap of the tubes 20, 30 of the stator and rotor electrodes being controlled by means of a screw-threaded portion 32 of the rotor electrode assembly, which engages with the complementarily screw-threaded interior 15 of the generally tubular portion 14.

The longitudinal axes of the electrode contact 14, the housing portion 12, the stator electrode tubes 20, 22, the rotor electrode tube 30, and the rotational axis of the screw-threaded portion 32 are all co-axial.

Figure 4:
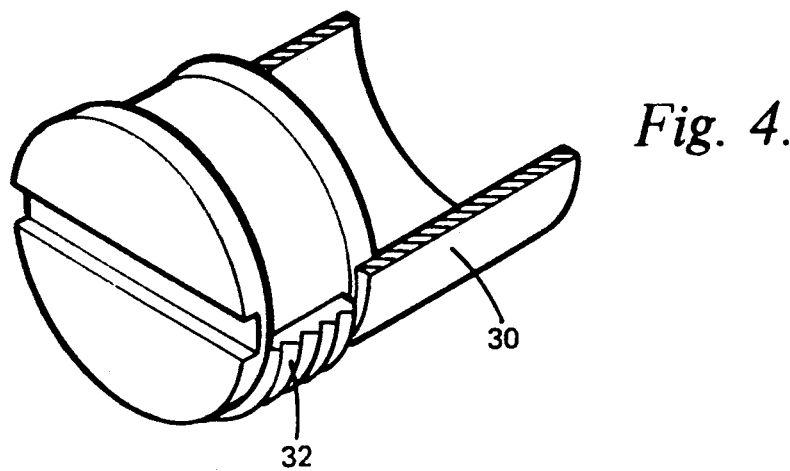
FIG. 4 is a perspective view, partly cut away, of the assembled electrode assembly of FIG. 2.
Figure 2:
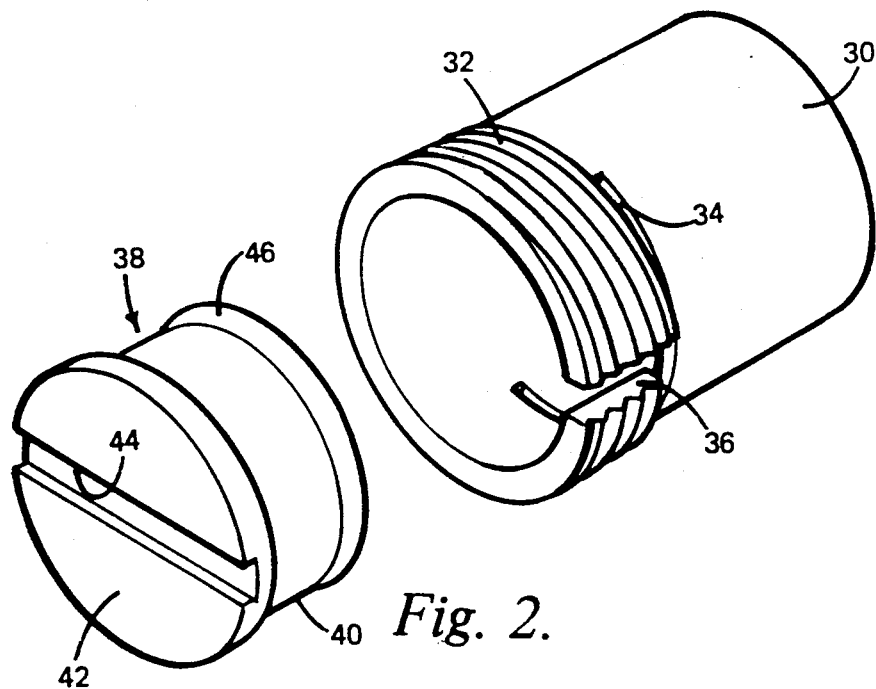
FIG. 2 is an exploded perspective view of a rotor electrode assembly used in the embodiment of FIG. 1.
Figure 3:
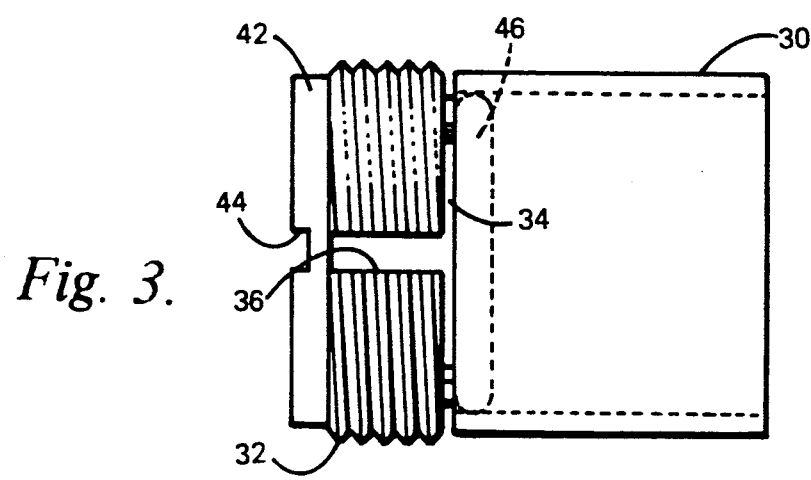
FIG. 3 is a side elevation of the assembly of FIG. 2.

The rotor electrode assembly is visible in more detail in FIGS. 2 to 4. As mentioned previously, the assembly comprises a tubular electrode 30 having an enlarged, screw-threaded portion 32 at one end thereof. At the base of the screw-threaded portion 32, a slot 34 is provided, and extends for approximately half the circumference of the tubular portion 30. The screw-threaded portion is split by means of a further, wider, slot 36 extending parallel to the longitudinal axis of the tubular portion 30 of the electrode. The part-circumferential slot 34 and the longitudinal slot 36 intersect, as best seen in FIGS. 2 and 3. The diameter of the screw-threaded portion 32 is larger than the internal diameter of the electrode contact 14. This may be because of the natural diameter of the threaded portion, or may be effected later by deformation once the slots 34, 36 are formed to increase the diameter of the threaded portion.

The rotor electrode assembly also comprises an actuator in the form of a metal plug 38. The plug comprises a central cylindrical portion 40 of diameter sufficiently small to accommodate some inward deformation of the threaded portion 32 of the electrode lying radially outwardly thereof, an enlarged head 42 having a screwdriver slot 44 disposed therein, and an enlarged base portion 46. In use, the plug is inserted into the screw-threaded end of the rotor electrode, and the enlarged base 46 is an interference fit with the internal surface of the tubular portion 30 of the rotor electrode. Rotation of the plug by means of a screwdriver thereby rotates the tubular portion 30 of the rotor electrode.

In use, the rotor electrode assembly is inserted into the electrode contact portion 14 of the capacitor housing with the tubular portion 30 entering first. The screw-threaded portion 32 of the rotor electrode assembly must then be resiliently deformed to enable it to engage with the complementarily screw-threaded interior of the electrode contact portion 14 of the capacitor housing. Since the screw-threaded portion of the rotor electrode assembly is resiliently deformable, it urges itself radially outwardly into firm contact with the interior of the electrode contact portion 14 of the housing, thereby allowing rotation of the plug and the rotor electrode by means of a screwdriver, but preventing inadvertent rotation as a result of vibration, shock or other perturbations. As the plug and the rotor electrode are rotated, the rotor electrode advances in the longitudinal direction, thereby overlapping the tubular stator electrode to a desired degree. It will be noted that a dielectric layer 48 is disposed between the stator and rotor electrodes in the embodiment illustrated, but the dielectric may be removed and may be formed by the air space between the rotor and stator electrodes.

The spring-mounting of the rotor electrode allows the rotor to be positioned independently of the position of the rotor, thus ensuring that the capacitance of the device varies linearly with adjustment. Moreover, any small burrs produced in the formation of the longitudinal slot 36 do not bear on the thread of the electrode contact portion 14, since bending of the screw-threaded portion will tend to occur in the regions of the ends of the circumferential slot 34. Thus the edges of the slot 36 will tend to be slightly recessed from the female thread, producing a smooth torque with no generation of wear particles. Also, the effective current flow is direct to the rotor from the rotor contact 14, thus minimising contact resistance and inductance, and eliminating the need for any wear generating wiping contacts often required in conventional designs.

As mentioned above, the screw-threaded portion 32 may be constructed to have a natural diameter greater than the internal diameter of the contact 14, or may be outwardly deformed to increase its diameter once the slots 34, 36 have been made. In either case, the portion 32 is subject to radially inward resilient deformation when in threaded engagement with the contact 14.

We claim:

1. An adjustable electrical device having a housing and an electrode of generally cylindrical configuration which is movable relative to the housing, the electrode comprising a resiliently deformable, externally screw-threaded portion which is in compliant threaded engagement with an internally screw-threaded portion of the housing, said externally screw-threaded portion being split to allow deformation thereof, and the split being in the form of a slot extending across said screw-threaded portion.

2. An adjustable electrical device according to claim 1, wherein the split is in the form of a first slot extending across said screw-threaded portion in a direction parallel to the rotational axis of said screw-threaded portion.

3. An adjustable electrical device according to claim 2 including a second slot located at the base of said screw-threaded portion, which interconnects with said first slot.

4. An adjustable electrical device according to claim 3 wherein the electrode is provided with an actuating member having a head portion adapted to receive an adjusting tool and a body portion which is an interference fit within the electrode.

5. An adjustable electrical device according to claim 4, wherein the electrode is in the form of a tubular electrode, and a body portion of said actuating member is an interference fit within said tubular electrode.

6. An adjustable electrical device according to claim 5, wherein the device is in the form of a trimmer capacitor and which further comprises a stator electrode having a cylindrical portion, said first electrode being tubular and movable relative to said stator electrode.

7. An adjustable electrical device according to claim 1, wherein the external diameter of said screw-threaded portion of the electrode is slightly greater than the internal diameter of said threaded portion of the housing whereby deformation thereof is necessary to achieve said threaded engagement.

8. An adjustable trimmer capacitor assembly comprising:
   a stator electrode having a cylindrical portion;
   a rotor electrode assembly; and
   a capacitor housing having an internally screw-threaded portion, said rotor electrode assembly comprising:
     a tubular electrode having an externally screw-threaded portion at one end thereof; and
     an electrode actuating member having a head portion adapted to receive an adjusting tool and a body portion which is an interference fit within the tubular electrode, said externally screw-threaded portion of said rotor electrode assembly being resiliently deformable to allow compliant threaded engagement with said internally screw-threaded portion of the housing, rotation being effected by means of said electrode actuating member, and the external diameter of said externally screw-threaded portion of said rotor electrode having a greater diameter than the internal diameter of said threaded portion of said housing whereby deformation thereof is necessary to achieve said threaded engagement.

9. An adjustable trimmer capacitor assembly according to claim 8 wherein said externally screw-threaded portion of said rotor electrode is split to allow deformation thereof.

10. An adjustable trimmer capacitor assembly according to claim 9, wherein the split is in the form of a slot extending across said externally screw-threaded portion.

11. An adjustable trimmer capacitor assembly according to claim 10, wherein the split is in the form of a slot extending across said screw-threaded portion in a direction parallel to the rotational axis of said externally screw-threaded portion.

12. An adjustable trimmer capacitor according to claim 11 further comprising a slot, located at a base of said externally screw-threaded portion, which interconnects with said first slot.

13. An adjustable trimmer capacitor according to claim 12, wherein said second slot is part-circumferential.

* * * * *